US008248523B2

(12) United States Patent
Chua et al.

(10) Patent No.: US 8,248,523 B2
(45) Date of Patent: Aug. 21, 2012

(54) CAMERA MODULE WITH FOLD OVER FLEXIBLE CIRCUIT AND CAVITY SUBSTRATE

(75) Inventors: Albert John Y. Chua, San Jose, CA (US); Abhijit Limaye, San Jose, CA (US)

(73) Assignee: Flextronics AP, LLC, Broomfield, CO (US)

( * ) Notice: Subject to any disclaimer, the term of this patent is extended or adjusted under 35 U.S.C. 154(b) by 336 days.

(21) Appl. No.: 12/590,325

(22) Filed: Nov. 5, 2009

(65) Prior Publication Data

US 2011/0102667 A1    May 5, 2011

(51) Int. Cl.
*H04N 5/225* (2006.01)
*H01L 27/00* (2006.01)
*H01L 23/06* (2006.01)
(52) U.S. Cl. ............... 348/374; 250/208.1; 257/684
(58) Field of Classification Search .............. 348/294, 348/340, 374; 250/208.1; 257/684, 686
See application file for complete search history.

(56) References Cited

U.S. PATENT DOCUMENTS

| | | | |
|---|---|---|---|
| 2005/0040510 A1* | 2/2005 | Hashimoto | 257/686 |
| 2005/0285973 A1* | 12/2005 | Singh et al. | 348/374 |
| 2006/0087017 A1* | 4/2006 | Chao et al. | 257/680 |
| 2006/0223216 A1* | 10/2006 | Chang et al. | 438/64 |
| 2008/0170141 A1* | 7/2008 | Tam et al. | 348/294 |
| 2008/0267617 A1* | 10/2008 | Huang et al. | 396/535 |

* cited by examiner

*Primary Examiner* — Trung Diep
(74) *Attorney, Agent, or Firm* — Marsh Fischmann & Breyfogle, LLP; Robert G. Crouch

(57) ABSTRACT

A disclosed method of manufacturing a camera module includes providing an image capture device, providing an electronic component, providing a flexible circuit substrate, mounting the image capture device on a first portion of the flexible circuit substrate, mounting the electronic component on the second portion of the flexible circuit substrate, and positioning the second portion above the first portion. The method further includes providing a chip carrier including a bottom surface defining a cavity and a top surface adapted to receive the image capture device and positioning the chip carrier between the image capture device and the flexible circuit substrate. The method further includes mounting a second electronic component within the cavity.

40 Claims, 7 Drawing Sheets

CAMERA MODULE WITH FOLD OVER FLEXIBLE CIRCUIT AND CAVITY SUBSTRATE

BACKGROUND OF THE INVENTION

1. Field of the Invention

This invention relates generally to electronic camera modules, and more particularly to miniature, digital camera modules. Even more particularly, this invention relates to a design for a miniature camera module that can host electronic components without increasing the overall size of the camera module.

2. Description of the Background Art

Digital camera modules are currently being incorporated into a variety of host devices. Such host devices include cellular telephones, personal data assistants (PDAs), computers, and so on. Consumer demand for digital camera modules in host devices continues to grow.

Host device manufacturers prefer digital camera modules to be small, so that they can be incorporated into the host device without increasing the overall size of the host device. Further, host device manufacturers prefer camera modules that minimally affect host device design. In meeting these requirements the host device manufacturers prefer camera modules that capture images of the highest possible quality. Of course, it is an ongoing goal for camera module manufacturers to design camera modules that meet these requirements at minimal manufacturing cost.

A conventional digital camera module generally includes a lens assembly, a housing, a printed circuit board (PCB), and an integrated circuit image capture device (ICD). Typically, the components are formed separately and later assembled to create the digital camera module. That is, the ICD is attached to the PCB, and then the housing is attached to the PCB so that the ICD is covered by the bottom of the housing. Then, the lens assembly is mounted to the opposite end of the housing to focus incident light onto an image capture surface of the ICD. The ICD is electrically coupled to the PCB, which includes a plurality of electrical contacts for the ICD to communicate image data to the host device for processing, display, and storage.

In order to make such camera modules more attractive to host device designers, manufacturers have added various designs and features. For example, it is common for a camera module to include a variable focus/zoom device for enhancing the quality of images captured at various focal fields. Typically, the variable focus/zoom device includes an electronic actuator coupled to one or more lenses of the lens assembly for displacing the lens(es) with respect to the image capture surface of the ICD and with respect to each other. In addition to variable focus/zoom devices, it is common for such camera modules to include a larger ICD with a greater numbers of photosensitive diodes to further increase the image quality. Also, many camera modules include other components (e.g., memory chips, processors, resistors, capacitors, inductors, etc.) that would otherwise be located on the host device. This is a desirable feature because host device designers prefer camera modules that operate independently from the host device so as to minimally impact the overall design of the host device.

Although a variable focus/zoom feature, larger ICD, and integrated electronic components add desirable features, the addition of such features increases the overall size of the camera module. Of course, this increase in size is undesirable to host device manufacturers.

In efforts to decrease the overall size of such camera modules without sacrificing image quality, manufacturers have developed many different designs and features. For example, camera module manufacturers can form the housing and/or other components over any electronic components which may already be fixed to the PCB, by molding the housing directly over the electronic components.

Although incorporating the electronic components within the walls of the housing decreases the overall size of the camera module, disadvantages still exist. For example, the number of electronic components is limited by the size of the camera module.

What is needed, therefore, is a compact camera module that is capable of capturing images of higher quality while taking up minimum space. What is also needed is a camera module that operates more independently from the host device. What is also needed is a camera module that minimally impacts the overall design of the hosting device. What is also needed is a camera module that can host more components without increasing the camera modules overall size.

SUMMARY

The present invention overcomes the problems associated with the prior art by providing a camera module and method for manufacturing a camera module that incorporates various features for increasing the image quality of captured images, operates more independently, and takes up less space within a hosting device. The invention also enables more components to be incorporated into a camera module without increasing the camera modules overall size.

The camera module includes an image capture device mounted on a first portion of a flexible circuit substrate and an electronic component (passive or active) mounted on a second portion of the flexible circuit substrate. The flexible circuit substrate is flexed into a position wherein the second portion is positioned above the first portion. The camera module further includes a housing mounted over the image capture device and a lens assembly mounted over the housing.

In one embodiment, the first portion and the second portion of the flexible circuit substrate are positioned in two separate non-parallel planes. In a particular example embodiment, the first portion and the second portion are positioned perpendicular to one another wherein the first portion defines the footprint of the camera module.

In another particular embodiment, the housing defines an outer wall extending along an axis that is perpendicular to the image capture surface of the image capture device. The second portion of the flexible circuit substrate is positioned around the outer wall of the housing. The second portion includes a plurality of planar surfaces which are each positioned into different planes perpendicular to the first portion of the flexible circuit substrate.

In another particular embodiment, the lens assembly includes an electrically driven actuator coupled to a lens for displacing the lens with respect to the image capture device. Further, the electronic component includes electrical data for driving the actuator. The actuator is electrically connected to the flexible circuit substrate via a second flexible printed substrate.

In another particular embodiment, the camera module includes at least one stiffener mounted on at least one of the first portion and the second portion of the flexible circuit substrate.

In another particular embodiment, the camera module includes a protective outer casing mounted over the housing, the lens assembly, and the second portion of the flexible circuit substrate. The inner wall of the casing engages the second portion of the flexible circuit substrate so as to hold it in position.

In yet another embodiment, the camera includes a ceramic chip carrier interposed between the first portion of the flexible circuit substrate and the image capture device. The camera module further includes an anisotropic conductive film interposed between the chip carrier and the first portion of the flexible circuit substrate. The chip carrier further includes a top surface for receiving the image capture device and a bottom surface defining a cavity for receiving a second electronic component. The height of the second electronic component is less than the depth of the cavity A disclosed method of manufacturing a camera module includes providing an image capture device, providing another electronic component, providing a flexible circuit substrate, mounting the image capture device on a first portion of said flexible circuit substrate, mounting the other electronic component on a second portion of the flexible circuit substrate, and positioning the second portion above said the portion.

In an example method, the step of positioning the second portion above the first portion includes flexing an intermediate portion of the flexible circuit substrate between the first portion and the second portion. Further, the step of positioning the second portion above the first portion includes positioning the first portion and the second portion in two separate planes which are not parallel to one another. The step of positioning the second portion above the first portion further includes positioning the first portion in a first plane and positioning the second portion in a second plane, the first plane being perpendicular to the second plane. The step of positioning the first portion in the first plane and positioning the second portion in the second plane further includes flexing the second portion to form a third portion of the flexible circuit substrate, the third portion being positioned in a third plane perpendicular to the first plane and the second plane.

A more particular method further includes providing a housing, providing a lens assembly, mounting the housing over the image capture device, and mounting the lens assembly over the housing. The step of providing a lens assembly further includes providing a lens actuator. The step of providing another electronic component further includes providing an electronic component for driving a lens actuator. The step of providing an actuator further includes providing a second flexible circuit substrate, connecting a first end of the second flexible circuit substrate to the first flexible circuit substrate, and connecting a second end of the second flexible circuit substrate to the actuator. The step of positioning the second portion above the first portion further includes positioning the second portion around the housing.

The method for manufacturing a camera module further includes providing a first stiffener and fixing the stiffener to the flexible circuit substrate. The method further includes providing a second stiffener, fixing the first stiffener to the first portion of the printed circuit substrate, and fixing the second stiffener to the second portion of the flexible circuit substrate.

The method of manufacturing a camera module further includes providing a protective outer casing and mounting the protective outer casing over the image capture device, the housing, the lens assembly and the second portion of the flexible circuit substrate.

Optionally, the method further includes providing a chip carrier including a top surface and a bottom surface, providing a second electronic component, forming a cavity on the bottom surface of the chip carrier, mounting the electronic component within the cavity, mounting the chip carrier on the first portion of the flexible circuit substrate, and mounting the image capture device on the top surface of the chip carrier. The step of mounting the electronic component within the cavity further includes mounting the electronic component to the bottom surface of the chip carrier.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a novel method of manufacturing a miniature camera module, optionally with an autofocus and/or zoom feature. In the following description, numerous specific details are set forth (e.g., various flexible circuit substrate shapes, various active/passive components, etc.) in order to provide a thorough understanding of the invention. Those skilled in the art will recognize, however, that the invention may be practiced apart from these specific details. In other instances, details of well known electronic assembly practices and components have been omitted, so as not to unnecessarily obscure the present invention.

Figure 1:
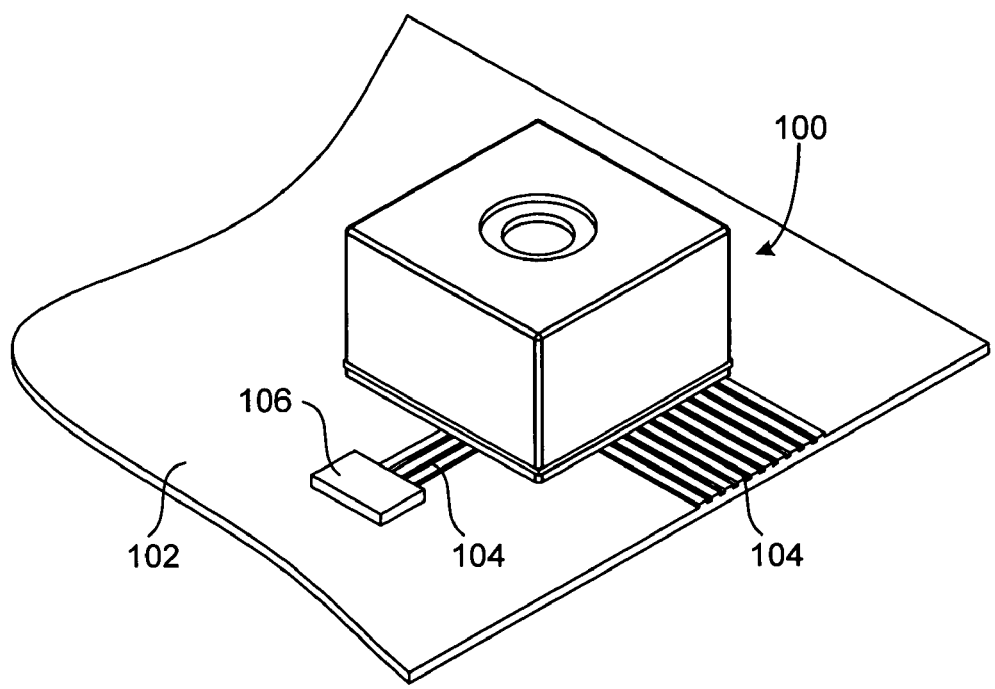
FIG. 1 is a perspective view of a camera module according to an example embodiment of the present invention mounted on a printed circuit board (PCB) of a host device.

FIG. 1 is a perspective view of a camera module 100 according to one embodiment of the present invention. Camera module 100 is shown mounted on a portion of a printed circuit board (PCB) 102 that represents a PCB of a camera hosting device (e.g., a main board of a cell phone). Camera module 100 communicates electronically with other components of the hosting device via a plurality of conductive traces 104. Device 106 represents an electronic component (e.g., passive or active electronic component) that may be mounted directly on PCB 102. Those skilled in the art will recognize that the particular design of PCB 102 will depend on the particular application, and is not particularly relevant to the present invention. Therefore, PCB 102, traces 104, and device 106 are representational in character only.

Figure 2:
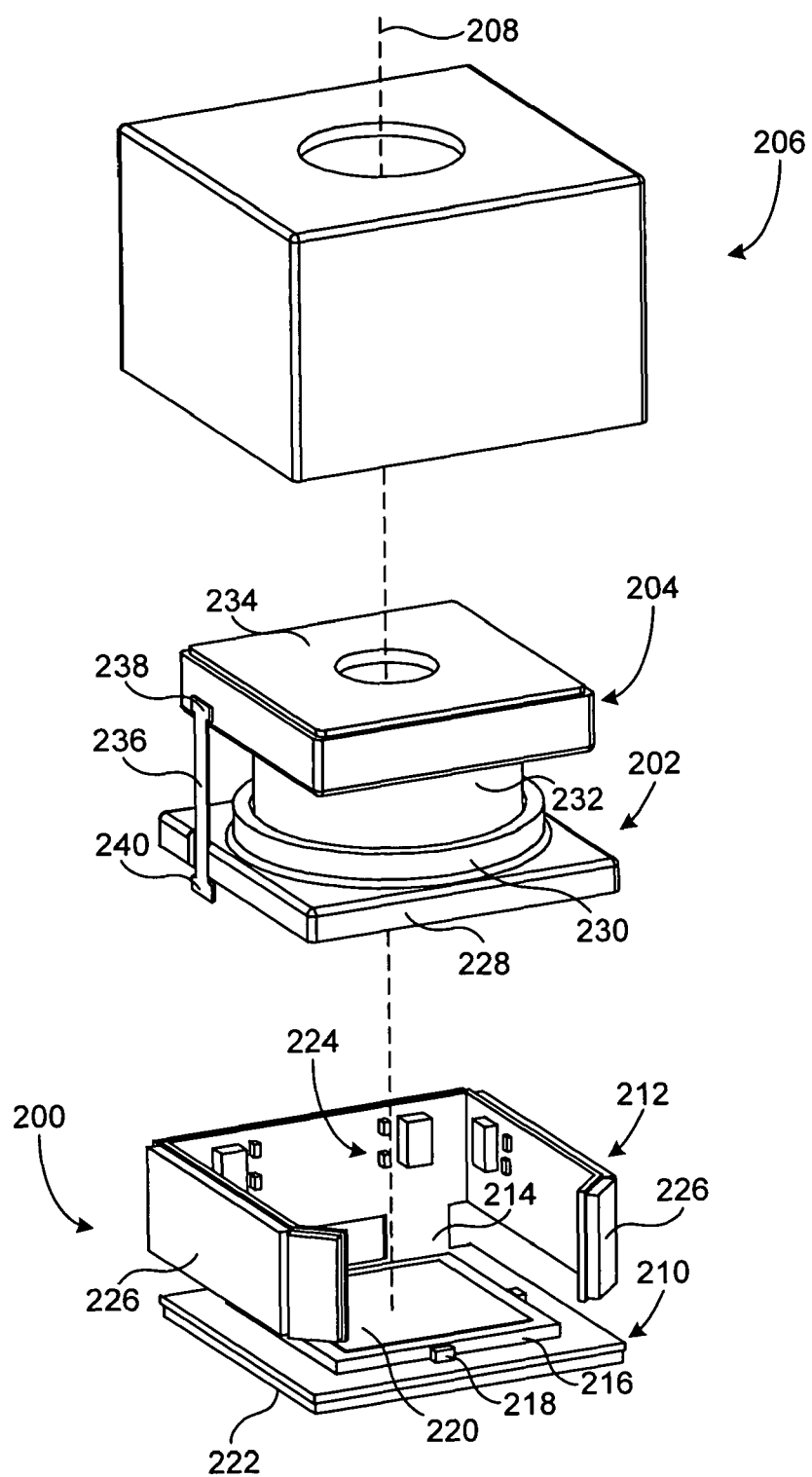
FIG. 2 is an exploded perspective view of the camera module of FIG. 1.

FIG. 2 is an exploded view of camera module 100 showing a flexible printed circuit (FPC) 200, a housing 202, a lens assembly 204, and an outer casing 206 exploded along an optical axis 208.

In this particular embodiment, FPC 200 includes a first portion 210, a second portion 212, and an intermediate portion 214. Note that intermediate portion 214 is flexed such that second portion 212 is positioned above first portion 210. In particular, second portion 212 is positioned above first portion 210 around housing 202 in planes that are substantially perpendicular to first portion 210. First portion 210 provides a surface for mounting an image capture device 216 and other passive or active electronic components 218. Image capture device 216 includes a planar image capture surface 220 which is perpendicular to optical axis 208. First portion 210 is shown fixed to a stiffener 222 to provide rigidity. Second portion 212 provides a surface for mounting various other electronic components 224. Second portion 212 is shown fixed to a set of stiffeners 226 to provide rigidity. Intermediate portion 214 includes circuitry (not shown) which provides a path for electrical communication between first portion 210 and second portion 212.

It should be noted that camera module 100 could be mounted to host device 102 by various means. For example, FPC 200 could include a third portion extending off first portion 210, which is then folded 180 degrees such that a set of contacts formed thereon would face PCB 102 and facilitate electrical connection thereto. As another example, first portion 210 could include a plurality of vias leading to a respective set of contacts formed on the rear surface of first portion 210. These are only some examples of the possible means for connecting camera module 100 to PCB 102.

Housing 202 includes a base 228 and an outer wall 230 extending upwardly along optical axis 208. Base 228 is adapted to mount on first portion 210 over image capture device 216 to protect image capture surface 220 from debris and other contaminants. Outer wall 230 provides support to lens assembly 204. In particular, outer wall 230 engages lens assembly 204 so as to fixably mount lens assembly 204 with respect to image capture device 216. Note that various methods for forming such housings are known. For example, housing 202 can be formed before it is mounted over image capture device 216. Alternatively, housing 202 can be formed (e.g., molded) directly over image capture device 216 and electronic components 218.

Lens assembly 204 includes a barrel 232 extending downwardly from an actuator 234 along optical axis 208. Barrel 323 encloses a set of lenses coaxially aligned along optical axis 208. Actuator 234 includes both a movable lens and an electrical lens driving means which, when actuated, moves the lens along optical axis 208. Indeed, this change in vertical displacement between the movable lens and image capture surface 220 results in a change in focal field and/or zoom of camera module 100. In this particular embodiment, actuator 234 is electrically connected to FPC 200 via a second FPC 236, which includes a first end 238 and a second end 240. First end 238 is adapted to electrically connect to actuator 234, and second end 240 is adapted to connect to FPC 200. Note that FPC 236 can be a separate FPC or can be a third portion of FPC 200 extended upwardly.

Outer casing 206 is a rigid boxlike structure which provides support to and protects the inner components of camera module 100. Outer casing 206 includes an inner surface (not shown) which surrounds and engages second portion 212 of FPC 200. In particular, outer casing prevents second portion 212 from moving freely, because FPC's have a tendency to move back to their original form (memory) if no support is present. Outer casing further provides rigidity to camera module 100 so that it can be handled without damaging sensitive components.

Figure 3:
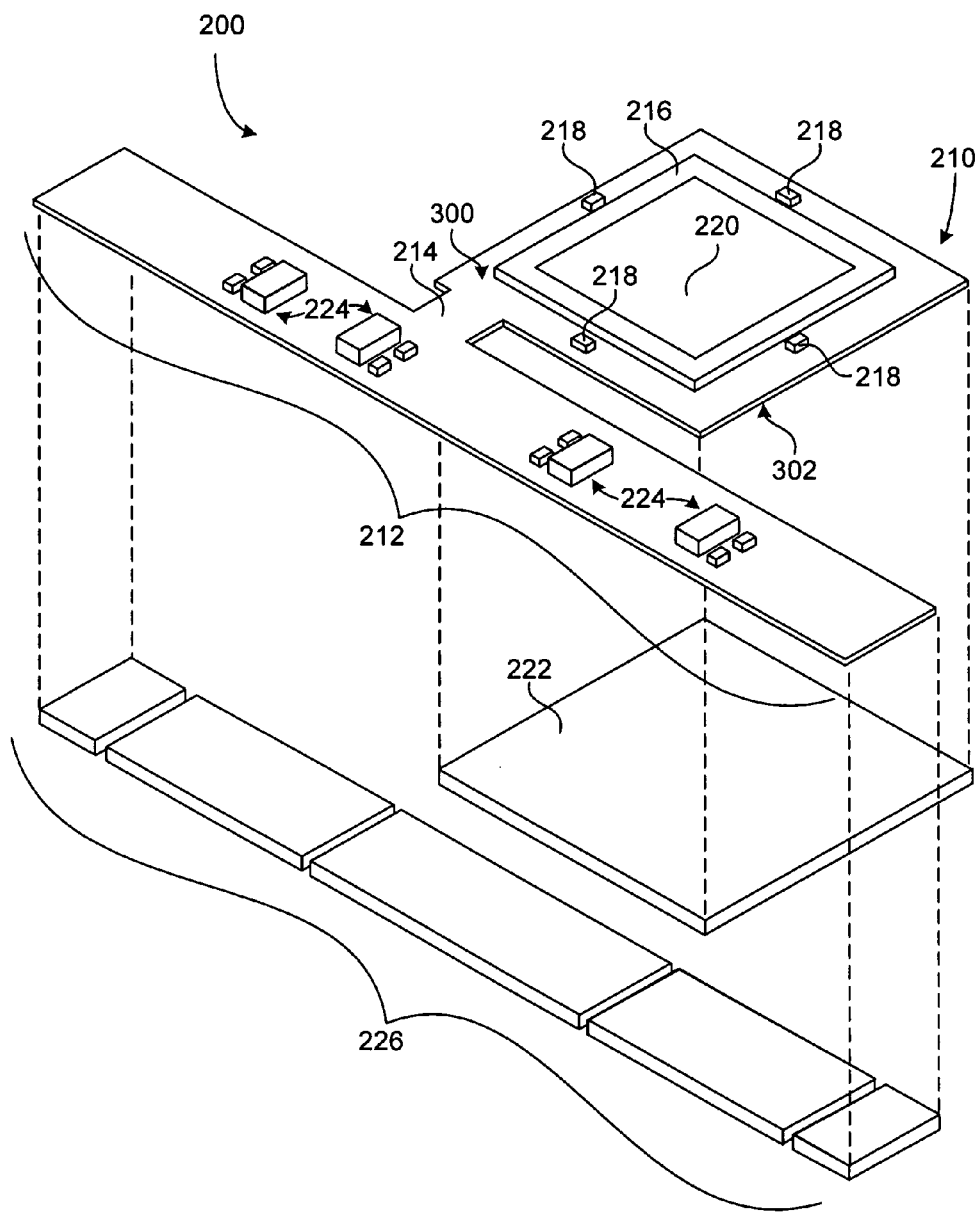
FIG. 3 is a perspective view of a flexible circuit substrate of the camera module of FIG. 1.

FIG. 3 shows a perspective view of FPC 200 before second portion 212 is flexed upwardly above first portion 210. As shown in this particular embodiment, first portion 210 and second portion 212 are coplanar and part of a single substrate. Image capture device 216, electronic components 218 and electronic components 224 are all mounted on a top surface 300 of FPC 200, and stiffeners 222 and 226 are mounted to a rear surface 302 of FPC 200. Mounting stiffeners 222 and 226 before mounting electronic components 218 and 224 provides an advantage, because the rigidity of stiffeners 222 and 226 provides support during the process of mounting electronic components 218 and 224. Note that such mounting methods (e.g., pick and place surface mount technology) for mounting electronic components are well known to those skilled in the art and, therefore, will not be described in detail. It should also be noted that electronic components 218 and 224 can include any type of electronic component (e.g., actuator chip, processor, ROM, RAM, transistors, etc.). Therefore, electronic components 218 and 224 are representational in character only.

Figure 4:
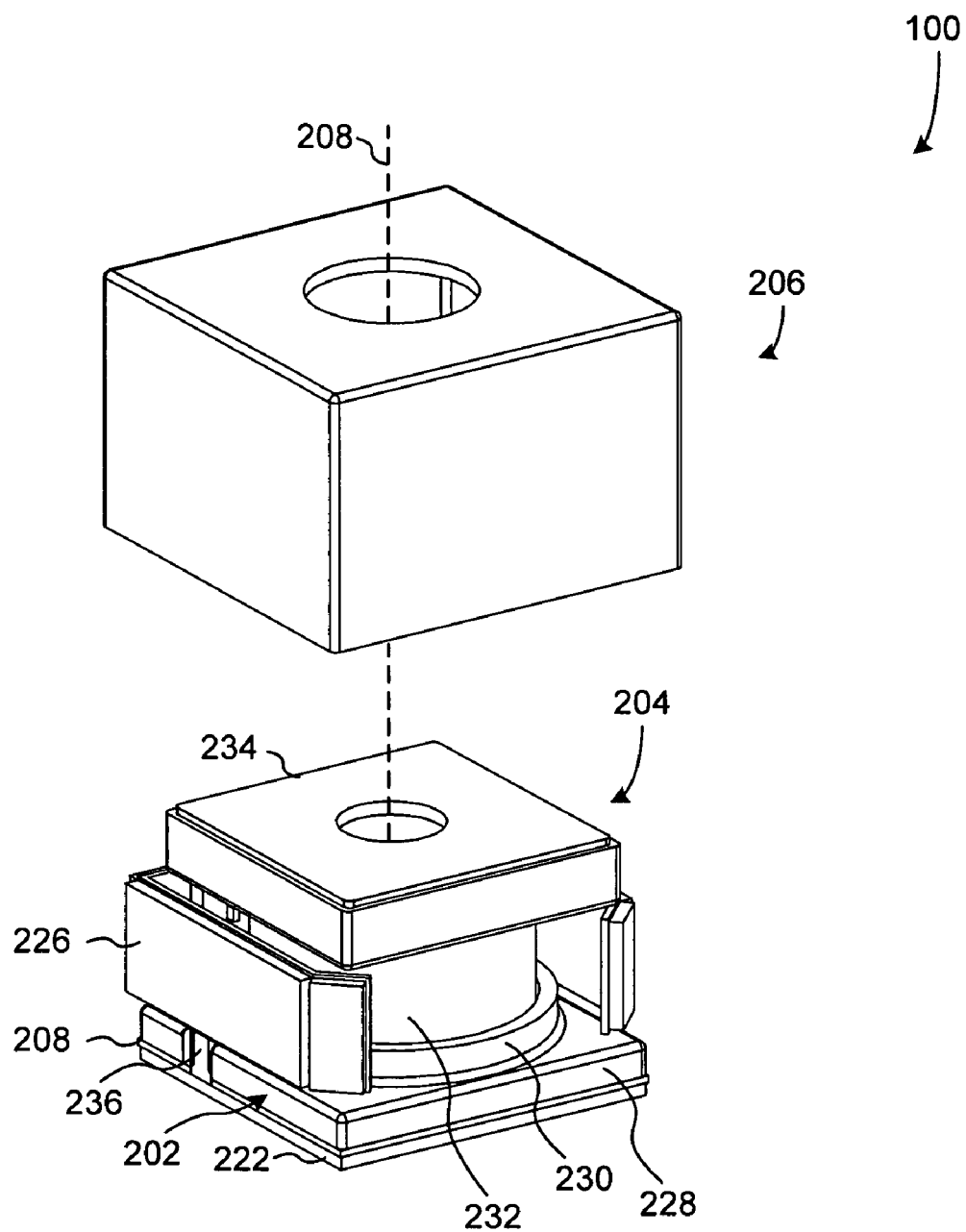
FIG. 4 is a perspective view of the camera module of FIG. 1 with an outer casing removed.

FIG. 4 shows a perspective view of camera module 100 with outer casing 206 removed. As shown, housing 202 is mounted on top surface 300 of first portion 210. Second portion 212 is then folded upward and around barrel 232 between actuator 234 and housing 202. Once second portion 212 is flexed in position, outer casing 206 is mounted to the top surface of base 228 such that the inner walls (not shown) engage stiffeners 226 and hold second portion 212 in position. Noted that first portion 210 of FPC 200 defines the footprint parameters of camera module 100.

Figure 5:
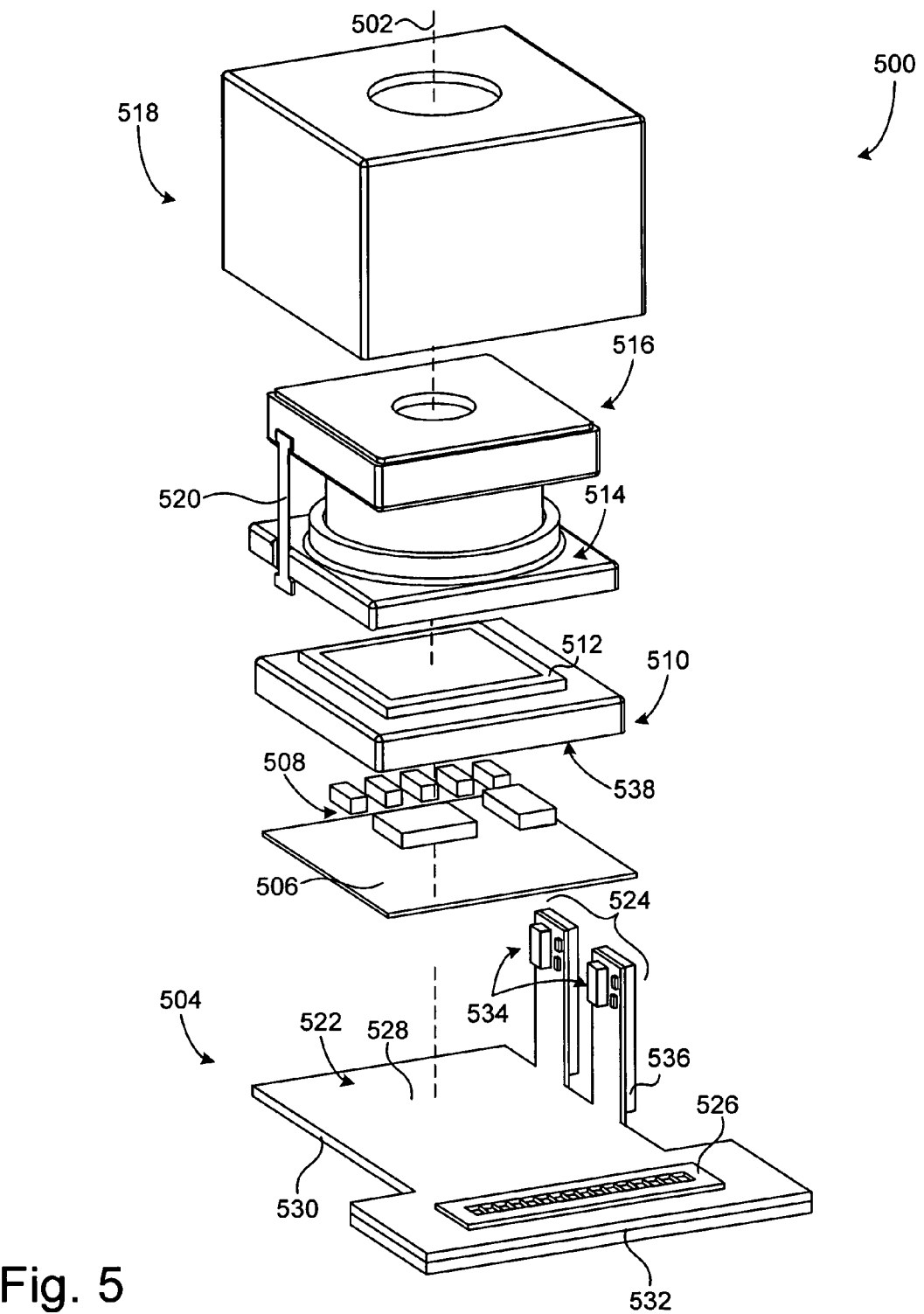
FIG. 5 is an exploded perspective view of an alternate camera module.

FIG. 5 shows a perspective view of an alternate camera module 500 exploded along an optical axis 502. Camera module 500 includes: an FPC 504, an anisotropic conductive film (ACF) 506, a group of electronic components 508, a ceramic substrate 510, an image capture device 512, a housing 514, a lens assembly 516, and an outer casing 518.

FPC 504 is a rigid-flex printed circuit board including a first portion 522 and a second portion 524. Rigid-flex circuit substrate is a single flexible circuit substrate including a thin flexible portion and a thicker, more rigid portion. In particular, second portion 524 is the thin flexible portion, and first portion 522 is the thicker more rigid portion. First portion 522 includes a pin connector 526 formed on a top surface 528 of FPC 504 to facilitate the electrical connection between a host device and camera module 500. Further, first portion 522 includes a rear surface 530 which is coupled to a stiffener 532 for providing rigidity when electrical connector 526 is electrically and physically connected to a host device. Second portion 524 includes a set of parallel surfaces flexed upward into a plane which is perpendicular to first portion 522 so as to provide a surface to mount a set of electronic components 534 which does not consume footprint area. A set of stiffeners 536 is shown mounted to rear 530 of second portion 524 to provide rigidity.

ACF 506 provides a means for electrically and physically connecting ceramic substrate 510 to FPC 504. In particular, a rear surface 538 of ceramic substrate 510 is coupled to top surface 528 of first portion 522. Note that ACF 506 is an anisotropic conductive film commonly known to those skilled in the art for simultaneously adhering and electrically connecting surfaces. Electronic components 508 are mounted on rear surface 538 within a cavity 540 (shown in FIG. 6) formed on ceramic substrate 510. Image capture device 512 is mounted on a top surface 542 of ceramic substrate 510.

Image capture device 512, housing 514, lens assembly 516, FPC 520, and outer casing 518 of FIG. 5 are substantially the same as image capture device 216, housing 202, lens assembly 204, FPC 236, and outer casing 206 of FIG. 2, respectively. Therefore, these components will not be described in detail, so as to avoid unnecessary repetitiveness.

Figure 6:
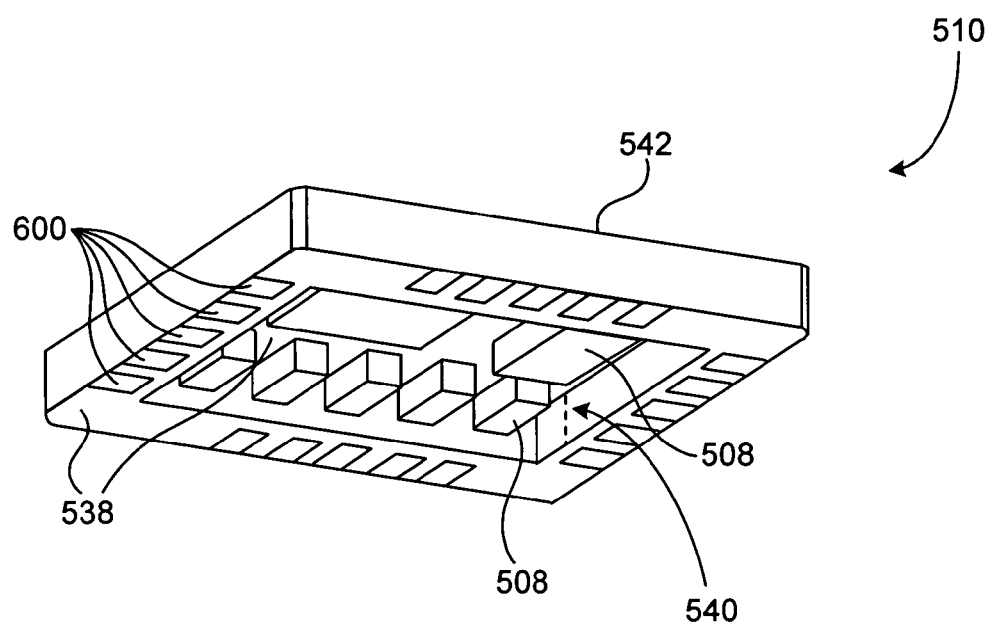
FIG. 6 is bottom perspective view of a chip carrier of the camera module of FIG. 5.

FIG. 6 is a perspective view of ceramic substrate 510 showing electronic components 508 mounted on rear surface 538. Electronic components 508 are shown mounted within cavity 540. Electronic components 508 can be mounted to rear surface 538 via any method known to those skilled in the art. Such methods include, but are not limited to, surface mount reflow, flip-chip assembly, and wire bonding with or without overmolding. The depth of cavity 540 is greater than the height of electronic components 508 such that the planarity between rear surface 538 and a circuit substrate are not altered by electronic components 508. It should also be noted that electronic components 508 could include various different devices including but not limited to: an actuator driver chip, EE-PROM, etc. Rear surface 538 further includes a set of contact pads 600 formed thereon to facilitate the electrical connection of ceramic substrate 510 to a circuit substrate.

Indeed, electronic components 508 can even include ICD 512. In that particular embodiment, ceramic substrate 510 defines an aperture through which lens assembly 516 can focus an image onto the image capture surface of ICD 512, which is flip-chip mounted onto rear surface 538.

Figure 7:
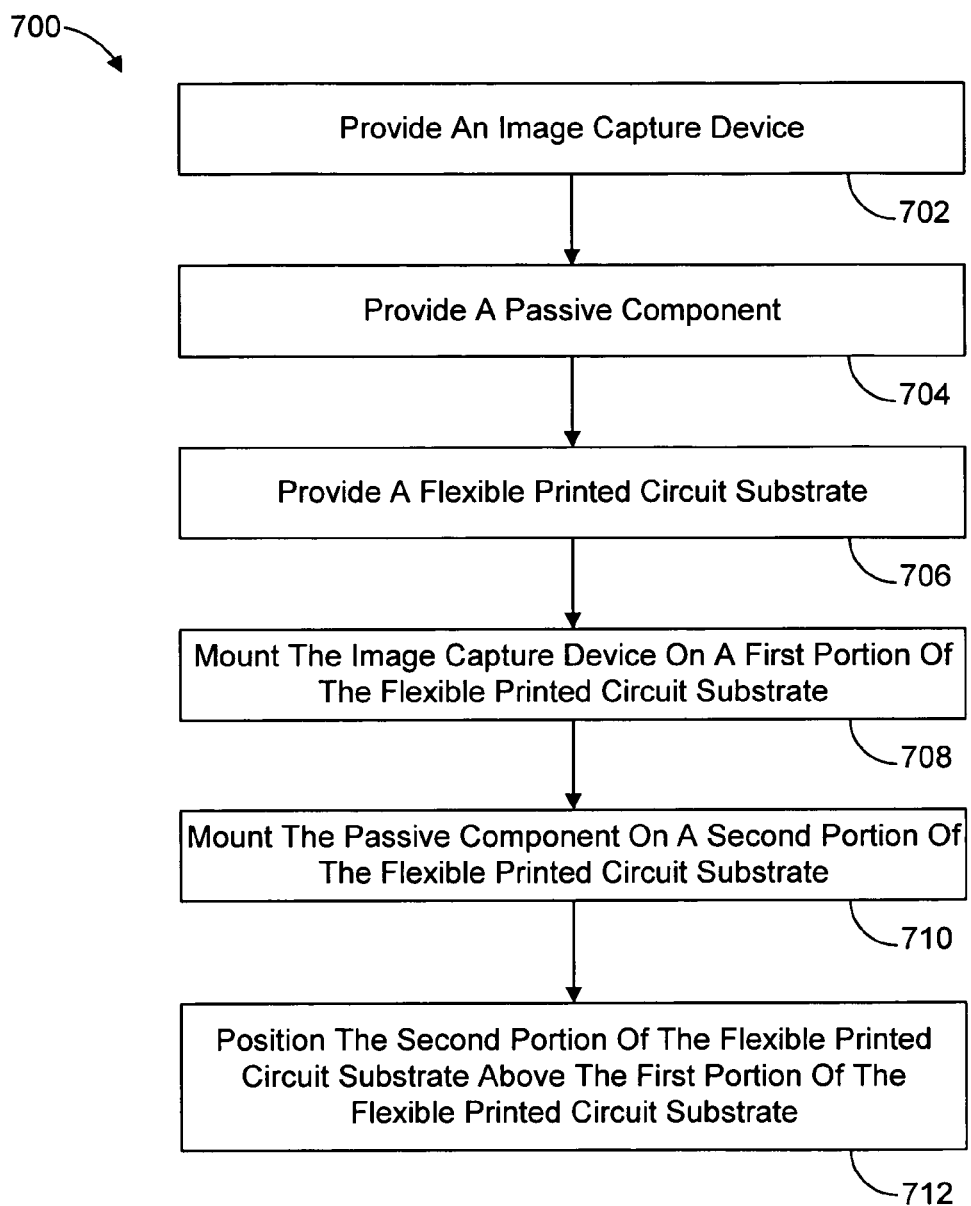
FIG. 7 is a flow chart summarizing an example method for manufacturing a camera module.

FIG. 7 is a flow chart 700 describing a method for manufacturing a camera module. In a first step 702, an image capture device is provided. Then, in a second step 704, an electronic component is provided. Next, in a third step 706, a flexible circuit substrate is provided. Then, in a fourth step 708, the image capture device is mounted on a first portion of the flexible circuit substrate. Next, in a fifth step 710 the electronic component is mounted on the second portion of the flexible circuit substrate. Finally, in a sixth step 712, the second portion of the flexible circuit substrate is positioned above the first portion of the flexible circuit substrate.

The description of particular embodiments of the present invention is now complete. Many of the described features may be substituted, altered or omitted without departing from the scope of the invention. For example, alternate electronic components (e.g., processors, RAM, ROM, transistors, resistors, etc), may be substituted for the electronic components shown. As another example, the flexible circuit substrate could include additional numbers of portions that are flexed in various directions. These and other deviations from the particular embodiments shown will be apparent to those skilled in the art, particularly in view of the foregoing disclosure.

We claim:

1. A camera module comprising;
an image capture device including a top surface defining a planar image capture surface and an opposite bottom surface;
an electronic component;
a flexible circuit substrate including a first portion and a second portion, said image capture device being coupled to said first portion, said electronic component being mounted on said second portion;
a housing positioned over said image capture device; and
a lens assembly coupled to said housing;
wherein said second portion of said flexible circuit substrate is positioned above said first portion of said flexible circuit substrate, so that the electronic component is positioned closer to the top surface of the image capture device than to the bottom surface of the image capture device.

2. A camera module according to claim 1, wherein said first portion of said flexible circuit substrate is positioned in a first plane and said second portion of said flexible circuit substrate is positioned in a second plane, said first plane being non-parallel to said second plane.

3. A camera module according to claim 2, wherein said first plane is perpendicular to said second plane.

4. A camera module according to claim 1, wherein said first portion of said flexible circuit substrate defines the footprint dimensions of said camera module.

5. A camera module according to claim 1, wherein said housing defines an outer wall extending along an axis, said axis being perpendicular to the center of said image capture device.

6. A camera module according to claim 5, wherein said second portion is formed substantially around said axis.

7. A camera module according to claim 5, wherein said second portion of said flexible circuit substrates includes a plurality of planar surfaces, each of said planar surfaces being located in different planes, each of said planar surfaces being perpendicular to said first portion of said flexible circuit substrate.

8. A camera module according to claim 5, wherein said second portion includes a first planar surface and said outer wall of said housing includes a second planar surface, said first planar surface being parallel to said second planar surface.

9. A camera module according to claim 1, wherein said lens assembly includes an electrically driven actuator coupled to a lens, said actuator being operative to displace said lens with respect to said image capture surface.

10. A camera module according to claim 9, wherein said electronic component includes electrical data for driving said actuator.

11. A camera module according to claim 9, further including a second flexible circuit substrate electrically connecting said first flexible circuit substrate to said actuator.

12. A camera module according to claim 1, wherein at least one of said first portion and said second portion are coupled to a stiffener.

13. A camera module according to claim 12, wherein both of said first portion and said second portion are each coupled to a stiffener.

14. A camera module according to claim 1, further including a protective outer casing mounted over said housing, said lens assembly, and said second portion of said flexible circuit substrate.

15. A camera module according to claim 14, wherein protective outer casing includes an inner wall engaging said second portion of said flexible circuit substrate.

16. A camera module according to claim 1, further including a chip carrier interposed between said first portion and said image capture device.

17. A camera module according to claim 16, further including an anistropic conductive film interposed between said chip carrier and said first portion.

18. A camera module according to claim 16, wherein said chip carrier includes a ceramic substrate.

19. A camera module according to claim 16, wherein said chip carrier includes a top surface and a bottom surface, said top surface being connected to image capture device and said bottom surface defining a cavity.

20. A camera module according to claim 19, further including a second electronic component mounted in said cavity.

21. A camera module according to claim 20, wherein said second electronic component is mounted to said bottom surface of said chip carrier.

22. A camera module according to claim 20, wherein said cavity includes a first height and said second electronic component includes a second height, said first height being greater than said second height.

23. A camera module according to claim 19, wherein said lens assembly includes a electronic lens actuator coupled to a lens, said lens actuator being operative move said lens with respect to said image capture surface.

24. A camera module according to claim 20, wherein said electronic component facilitates the driving of said actuator.

25. A method for manufacturing a camera module, said method including:
- providing an image capture device having a top image capture surface and an opposite bottom surface;
- providing an electronic component;
- providing a flexible circuit substrate;
- mounting said image capture device on a first portion of said flexible circuit substrate;
- mounting said electronic component on a second portion of said flexible circuit substrate; and
- positioning said second portion above said first portion, so that the electronic component is positioned closer to the top image capture surface than to the bottom surface of the image capture device.

26. A method for manufacturing a camera module according to claim 25, wherein said step of position said second portion above said first portion includes flexing an intermediate portion of said flexible circuit substrate between said first portion and said second portion.

27. A method according to claim 26, wherein said step of position said second portion above said first portion includes positioning said first portion and said second portion in two separate non-parallel planes.

28. A method according to claim 27, wherein said step of position said second portion above said first portion further includes positioning said first portion in a first plane and positioning said second portion in a second plane, said first plane being perpendicular to said second plane.

29. A method according to claim 28, wherein said step of positioning said first portion in a first plane and positioning said second portion in a second plane further includes flexing said second portion to form a third portion of said flexible circuit substrate, said third portion being positioned in a third plane, said third plane being perpendicular to said first plane and said second plane.

30. A method according to claim 25, further including: providing a housing; providing a lens assembly; mounting said housing over said image capture device; and mounting said lens assembly on said housing.

31. A method according to claim 30, wherein said step of providing a lens assembly further includes providing a lens actuator.

32. A method according to claim 31, wherein said step of providing an electronic component includes providing an electronic component for driving a lens actuator.

33. A method according to claim 31, further including: providing a second flexible circuit substrate including a first end and a second end; electrically connecting said first end of said second flexible circuit substrate to said first flexible circuit substrate; and electrically connecting said second end of said flexible circuit substrate to said actuator.

34. A method according to claim 30, wherein said method of positioning said second portion above said first portion includes positioning said second portion around said housing.

35. A method according to claim 25, further including: providing a first stiffener; and fixing said stiffener to said flexible circuit substrate.

36. A method according to claim 35, further including: providing a second stiffener; and fixing said first stiffener to said first portion of said flexible circuit substrate; and fixing said second stiffener to said second portion of said flexible circuit substrate.

37. A method according to claim 25, further including: providing a protective outer casing; and mounting said protective outer casing over said second image capture device, said housing, said lens assembly, and said second portion of said flexible circuit substrate.

38. A method according to claim 25, further including: providing a chip carrier including a top surface and a bottom surface; providing a second electronic component; forming a cavity on said bottom surface of said chip carrier; mounting said electronic component within said cavity; mounting said chip carrier on said first portion of said flexible circuit substrate; and mounting said image capture device on said top surface of said chip carrier.

39. A method according to claim 38, wherein said step of mounting said electronic component within said cavity includes mounting said electronic component to said bottom surface of said chip carrier.

40. A camera module, comprising:
- a flexible circuit substrate including a first portion and a second portion;
- an image capture device having a first side and an opposite second side, the first side having an image sensing surface which receives light for an image to be captured, the image capture device mounted to the first portion of the flexible circuit substrate;
- a plurality of electronic components that are mounted to the second portion of the flexible circuit substrate;
- a cover positioned over the image capture substrate;
- wherein the second portion of the flexible circuit substrate is positioned in a plane that is not parallel to a plane that the first portion is positioned in;
- wherein the second portion is positioned so that the plurality of electronic components are closer to the first side of the image capture device than to the second side of the image capture device.

* * * * *